Nov. 16, 1954     M. ROSE     2,694,247
RIM FOR BUFFING TIRES
Filed Aug. 1, 1952     2 Sheets-Sheet 1
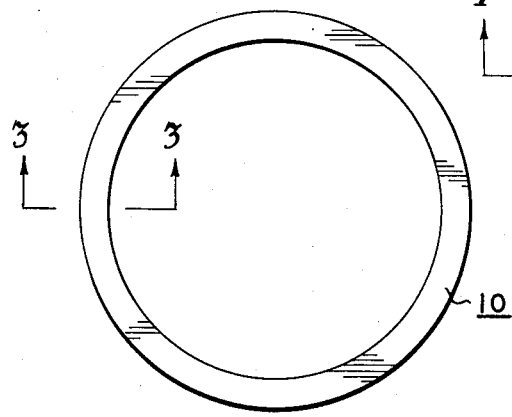
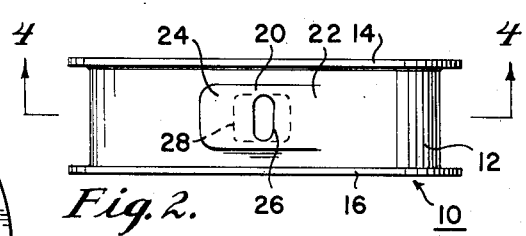
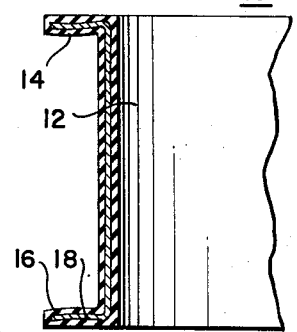
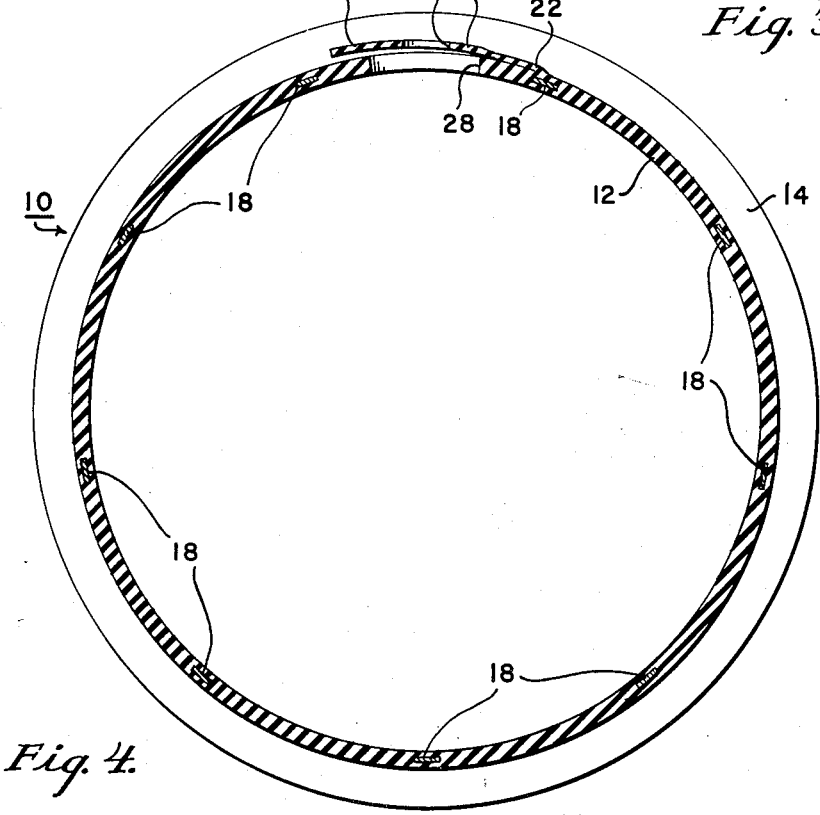
INVENTOR.
MICHAEL ROSE
BY
Caesar and Rivise
ATTORNEYS.

Nov. 16, 1954  M. ROSE  2,694,247
RIM FOR BUFFING TIRES
Filed Aug. 1, 1952  2 Sheets-Sheet 2

INVENTOR.
MICHAEL ROSE
BY Caesar and Rivise
ATTORNEYS.

United States Patent Office 2,694,247
Patented Nov. 16, 1954

2,694,247

RIM FOR BUFFING TIRES

Michael Rose, Philadelphia, Pa.

Application August 1, 1952, Serial No. 302,291

3 Claims. (Cl. 29—76)

This invention relates to rims for tires, and more particularly to rims for use on tires during buffing operations.

Tire buffing operations are usually carried out in connection with the retreading of tires. Heretofore difficulty has been encountered in buffing tires on a buffing machine of the type disclosed in U. S. Patent No. 2,160,143 issued to Charles J. Hayton on May 30, 1939, when the tire is highly flexible. Because the tire deforms due to itis flexibility when forced against the buffing rasp, the pressure applied and the shape to which the tire is to be buffed can not easily be controlled.

Therefore it is a principal object of this invention to provide a new and improved tire rim for adapting a buffing machine of the type considered for efficient operation upon highly flexible tires.

Another object of this invention is to provide a new and improved tire rim for use on tires during a buffing operation.

Still another object of the invention is to provide a new and improved rim for buffing tires which may easily be applied to and removed from tires.

Yet another object of this invention is to provide a new and improved rim adapted for use with the considered type of tire buffing machine increasing its utility.

A further object of this invention is to provide a new and improved rim for buffing tires carrying an inner tube and provided with means for protecting the valve stem of the inner tube.

The above is accomplished by providing a flexible resilient rim member which is substantially circular in form and comprises a central portion and two radially extending flange portions which are substantially U-shaped in radial cross section for retaining the bead portions of a tire. The central and flange portions of the rim have embedded therein a plurality of radially spaced stiffening elements which allow the beads of the tire to be better gripped and retained by the rim. A flap member which is positioned over the convex side of the central portion of the rim member has a first end fixed with the rim portion and a second unsecured end. The flap member is provided with an opening which coincides with an opening in the central portion for receiving therethrough the valve stem of an inner tube which is contained by the tire. The opening in the central portion of the rim is proportioned so that the end of the valve stem may be retained between its edge and the unsecured end of the flap. Thus the valve stem may be withdrawn into the rim for the purpose of protecting it during the tire buffing operation.

To perform a buffing operation using the flexible resilient rim of the invention an innertube is placed in a tire to be buffed, and the flexible resilient rim is then placed on the tire with the innertube valve stem extending through the openings in the rim provided therefore. The innertube may now be inflated to impart the desired firmness to the tire and the valve stem withdrawn into the rim. The partially inflated tire with the rim installed may now be placed on a buffing machine of the type disclosed in U. S. Patent No. 2,160,143 and buffed in the usual manner.

The above objects of the invention as well as many other objects will become apparent when the following description of the invention is read together with the drawings in which:

Figure 1 is a side elevational view of the tire embodying the invention,

Figure 2 is a plan view of the rim shown in Figure 1.

Figure 3 is a fragmentary view taken on the line 3—3 in Figure 1,

Figure 4 is a sectional view taken on the line 4—4 in Figure 2,

Figure 5:
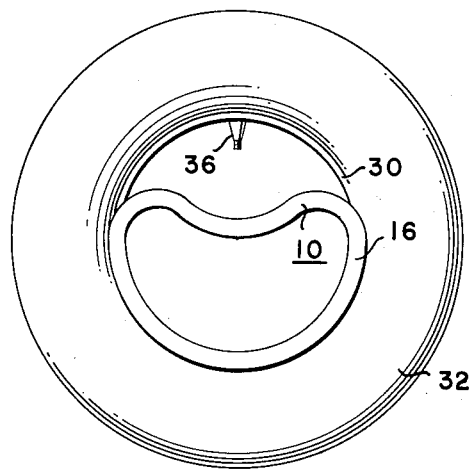
Figure 6:
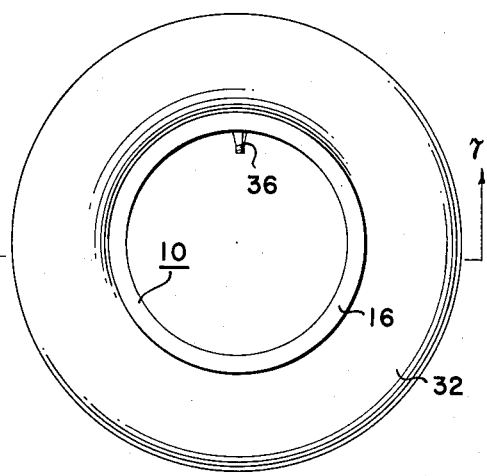
Figure 7:
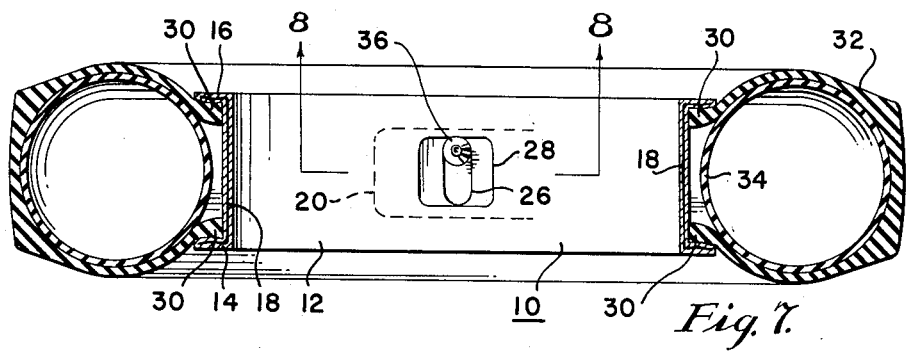
Figure 8:
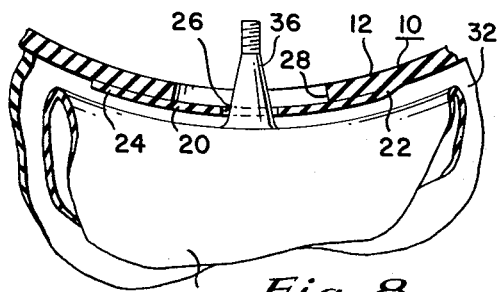
Figure 9:
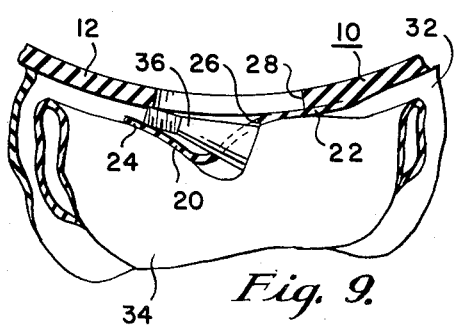

Figure 5 shows the rim in distorted form during the process of its application to a tire provided with an innertube, Figure 6 shows the rim fully applied to the tire and innertube shown in Figure 5, Figure 7 is a sectional view on line 7—7 of Figure 6, Figure 8 is a fragmentary sectional view taken on the line 8—8 of Figure 7 showing the valve stem of the innertube projecting through the flap and central portion of the rim, and Figure 9 is a view similar to Figure 8 showing the valve stem of the innertube retracted between the flap member and the central portion of the rim.

Like reference numerals designate like parts throughout the several views.

Refer to Figures 1, 2, 3 and 4 for a detailed description of the flexible resilient rim 10 which may be of a rubber or rubber-like composition. The rim 10 has a central portion 12 which is substantially circular in form, and two radially extending flange portions 14 and 16. A radial section through the central portion 12 and radially extended flange portions 14, 16 may be substantially U-shaped in configuration for the purpose of retaining the bead portions of a tire to be buffed.

A plurality of stiffening elements 18 which may be made of metallic substance are provided for better gripping and securing the bead portions of a tire to which the rim 10 is applied. The stiffening elements 18 may be radially spaced around the rim 10 and embedded therein. The stiffening elements 18 may be made to conform to the substantially U-shaped radial section of the rim 10, passing from one flange portion 14 to the other flange portion 16 through the central portion 12.

A flap member 20 is positioned over the convex side of the central portion 12 of the rim 10. One end 22 of the flap member 20 is secured to the central portion 12 of the rim 10, while its other end 24 is unsecured. Openings 26 and 28 are provided respectively in the flap member 20 and the central portion 12 of the rim 10 for the purpose of receiving therethrough the valve stem of an innertube, which will be considered in greater detail in connection with Figures 7, 8 and 9.

Figure 5 shows the rim 10 in deformed condition during the process of its application to the bead portions 30 of a tire 32 which is to be buffed. It is noted that a conventional innertube 34 (see Figure 7) having a radially projecting valve stem 36, has been positioned within the tire 32 prior to the application of the rim 10. Because the rim 10 is made of resilient flexible material allowing its deformation it may be easily and quickly applied to the tire 32. The stiffening elements 18, it is noted, allow the rim 10 to be deformed for application to the tire 32 and yet imparts the firmness required to grip and firmly retain the bead portions 30 within the rim 10.

Figures 6 and 7 show the rim 10 fully applied to the bead portions 30 of the tire 32. Figure 7 clearly shows how the central portion 12 and the flange portions 14, 16 reinforced by the embedded stiffening elements 18 grip and retain the bead portions 30 in position within the rim 10.

The innertube valve stem 36 projects through the openings 26 and 28 respectively in the flap member 20 and central portion 12 of the rim 10. The openings 26 and 28 are elongated in the direction between the flanges 14 and 16. Because of this the valve stem 36 which is generally off centered on its tube 34, may be received through the openings 26, 28 when the valve stem 36 is off set towards either of the flanges 14 or 16.

The proportioning of the opening 28 in the central portion 12 of rim 10 in the direction parallel to the flange portions 14, 16, will now be described in connection with Figures 8 and 9.

Figure 8 shows the innertube 34 positioned within the tube 32 with the rim 10 applied thereto so that the stem 36 of the innertube 34 projects radially through the openings 26 and 28 respectively in the flap 20 and in central portion 12 of the rim 10. The innertube 34 may be inflated with air through the valve stem 36 to impart the firmness to the tire 32 which is desired.

As shown by Figure 9 the valve stem 36 may now be withdrawn and retracted within the rim 10 by forcing the top end of the valve stem 36 beneath the edge of the opening 28, so that it is retained between the central portion 12 of the rim 10 and the unsecured end 24 of the flap member 20. It is thus seen that the opening 28 is dimensioned so that its edge just catches the top portion of the valve stem 36 when it is forced under the central portion 12.

Because of the enlarged dimensions of the opening 28, the flap member 20 is useful in protecting the innertube 34 by preventing the portion of the innertube 34 adjacent the opening 28 from being forced out through the opening 28.

The tire 32 and innertube 34, with the rim 10 installed and the valve stem 36 retracted, may now be applied in the usual manner to the buffing machine of the type shown in U. S. Patent No. 2,160,143 and the buffing operation carried out. This type of machine may now be used for buffing highly flexible tires which tires were previously extremely difficult or impossible to properly buff. This is accomplished by the application of the rim of the invention and the use of a partially inflated innertube to impart the required stiffness to the tire. The highly flexible tires may now be buffed faster and to the proper contour for retreading. The softest and most flexible tires may be buffed without extra effort. Buffing efficiency on highly flexible tires is greatly increased with the use of the invention, for example each rasp used by the buffing machine will buff approximately 50% more tires before it must be replaced. Furthermore the tendency is reduced for the rasp to dig into and tear the cord body which renders the tire useless.

Because the valve stem is retracted and the rim is made of a rubber or rubberlike material, it may ride on the iron rollers of the buffing machine as would the tire without the application of the rim. The flexible resilient rim 10 does not have the disadvantages inherent in hard rims, such as slipping on the rollers of the buffing machine, producing sparks and noisy operation.

It will be obvious to those skilled in the art that the invention may find wide application with appropriate modification to meet the design's circumstances, but without substantial departure from the essence of the invention.

What is claimed is:

1. A flexible resilient rim member substantially circular in form comprising a central portion and two marginal flanges extending radially therefrom and adapted to retain the bead portions of a tire, and a plurality of circumferentially spaced stiffening elements carried by said central portion, said member being resiliently flexible at least in the direction toward the center of said member.

2. A flexible resilient rim member substantially circular in form and including radially extending marginal flanges adapted to retain the bead portions of a tire, and a plurality of circumferentially spaced substantially U-shaped stiffening elements carried by said rim member, said member being resiliently flexible at least in the direction toward the center of said member.

3. A flexible resilient rim member substantially circular in form comprising a central portion and two marginal flanges extending radially therefrom and adapted to retain the bead portions of a tire, said member being resiliently flexible at least in the direction toward the center of said member, and a flap member positioned over the convex side of the central portion and having a first end fixed with said central portion and a second unsecured end, said central portion and flap member each being provided with an opening for receiving there through the valve stem of a tire tube, the opening in said central portion being proportioned so that the end of the valve stem may be retained between its edge and the unsecured end of said flap.

References Cited in the file of this patent

UNITED STATES PATENTS

| Number | Name | Date |
| --- | --- | --- |
| 497,464 | Welsch | May 16, 1893 |
| 1,198,790 | Fern | Sept. 19, 1916 |
| 1,300,391 | Hibbs | Apr. 15, 1919 |
| 1,547,700 | Washko | July 28, 1925 |
| 1,692,344 | Moran | Nov. 20, 1928 |
| 1,820,857 | Wilson | Aug. 25, 1931 |
| 2,071,864 | Myers | Feb. 23, 1937 |
| 2,270,119 | Green | Jan. 13, 1942 |